Jan. 27, 1942. A. V. NICOLLE ET AL 2,271,024
PISTON
Filed Feb. 24, 1939 3 Sheets-Sheet 1

Inventors
A. V. Nicolle &
P. White

By Glascock Downing &c
Attys.

Jan. 27, 1942. A. V. NICOLLE ET AL 2,271,024

PISTON

Filed Feb. 24, 1939 3 Sheets-Sheet 2

Inventors,
A. V. Nicolle +
P. White

By Glascock Downing & Seebold
Attys.

Inventors
A. V. Nicolle &
P. White
by Glascock Downing & Seebold
Attys.

Patented Jan. 27, 1942

2,271,024

UNITED STATES PATENT OFFICE 2,271,024

PISTON

Arthur Villeneuve Nicolle and Percy White, Twickenham, England

Application February 24, 1939, Serial No. 258,325
In Great Britain September 23, 1938

6 Claims. (Cl. 309—13)

This invention relates to pistons primarily for internal combustion engines and has for its object to provide a piston which is made mainly of light alloy and which shall not only have an effective coefficient of expansion less than the light alloy itself, but shall also expand uniformly under working conditions. The two greatest problems met with in using pistons of light alloys are—

(I) That the coefficients of expansion of light alloys are greater than that of cast iron and other materials of which cylinders are made, and (II) That there is always a tendency for the top of a piston skirt to expand more than the bottom thereof.

The invention, therefore, seeks to overcome these problems.

In a broad aspect the invention consists in a piston primarily for internal combustion engines wherein a coil of wire encircling the skirt of the piston and having a coefficient of expansion less than that of the skirt is adapted when the piston expands to oppose such expansion in a radial direction.

Thus, according to the invention, the skirt of a light alloy piston, for example a piston formed from an alloy of aluminum, is provided with a wire winding which may be cast into the piston during manufacture thereof or be applied thereto after the casting operation.

The wire, which may be of steel or iron wire and which may be flattened in the portion thereof which contacts with the skirt, is wound spirally lengthwise of the piston skirt and serves to control and restrict the expansion of the latter. While the wire winding may extend over substantially the entire length of the skirt, in some cases it might be found desirable to confine the wire winding to one or more definite parts of the skirt. For example, the winding may be applied only to the top portion of the skirt, say over the first ½" thereof, the remainder of the skirt being left plain, or being split according to particular requirements. The winding of the piston skirt with wire only at one or more definite places provides that the part or parts of the piston skirt having the wire winding will expand less than the part or parts where there is no wire. The same effect could be achieved by adopting a uniform wire winding lengthwise of the piston and varying the thickness of the skirt longitudinally thereof, the exterior surface of the skirt being of uniform diameter and the interior surface of varying diameter from top to bottom, the skirt thus being thin at the top and thick at the bottom. A similar effect may be achieved by varying the thickness, strength or pitch of the wire winding.

It is well recognized that the only substantial objection to aluminium pistons is that they expand more rapidly than the cylinder block in which they work. By winding wire on to the piston it is not only possible to obtain a piston which expands uniformly, but also to restrict the expansion in such way as to cause the piston to have approximately the same expansion as the cylinder block. Where steel wire is found to expand too much to provide a satisfactory winding, the wire may be formed from nickel-iron wire whose coefficient of expansion is less than that of usual steel.

Various measures may be adopted for retaining the wire winding upon the piston. For example, the terminal ends of the wire constituting the winding may be anchored to the piston skirt, which may be achieved by forming the starting end of the wire with an enlargement in the form of a head which may have a conical side wall adapted to seat against a corresponding surface provided by an aperture formed in the piston skirt, the wire being passed from the inside of the piston to the outside thereof, and after being wound upon the piston having its other terminal end turned inwardly into another conical aperture provided in the piston wall, the anchorage of the finishing end of the wire winding being completed if necessary by fixing a bead of solder to the end of the wire.

As a further, or alternative means for facilitating the assembly of the wire winding upon the piston, the latter, upon its exterior surface, may be roughened so as to receive the wire turns, the roughening taking the form of a spiral depression into which the wire will seat itself as it is wound. The shoulders provided at the upper and lower boundaries of the roughened piston surface or surfaces provide abutments for the outer portions of the wire winding or windings which serve to locate the latter upon the skirt in their correct longitudinal position. The winding if desired may be subjected to a tinning or oxidising process.

It is desirable that there shall be no undue tension in the wire winding and one way of ensuring this is to commence the winding operation with the first turns of the wire temporarily held together by a soldered joint and finishing the winding operation with the last turns of the wire likewise held together, the final securing of the wire being effected within the piston interior by the ends of the wire being bent together and secured by a rivet or the like.

Figure 1:
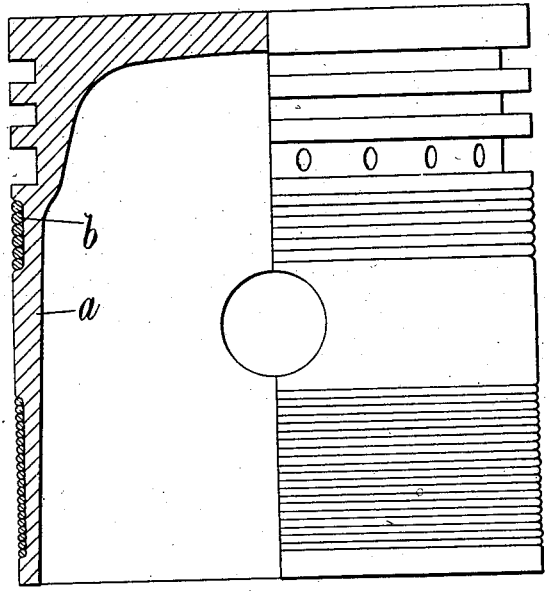
Figures 1 to 3 show in half sectional elevation views of various forms which the invention may conveniently take.

In Figure 1 the piston is shown with its skirt $a$ provided with an upper winding $b$ of wire which is of somewhat greater gauge than that of the lower wire winding.

Figure 2:
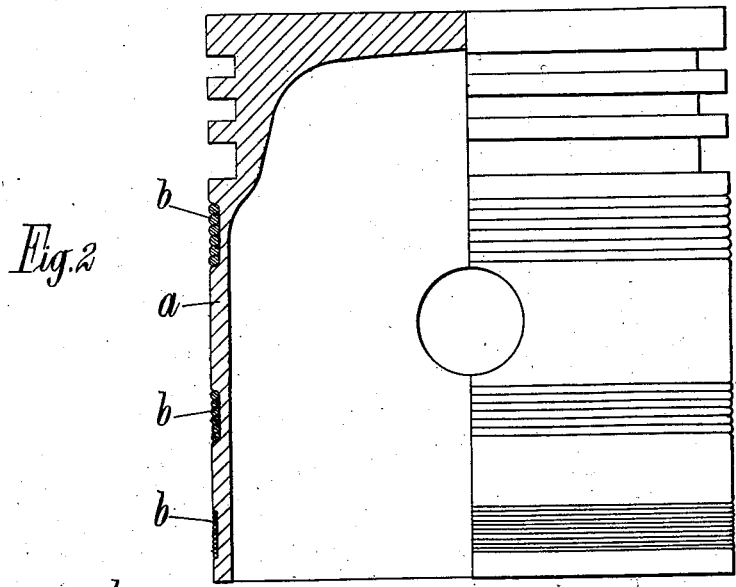
Figure 5:
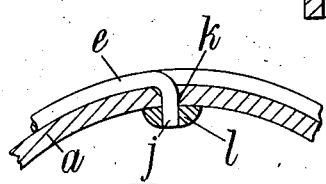
Figure 5 is a similar view of an alternative mode.
Figure 3:
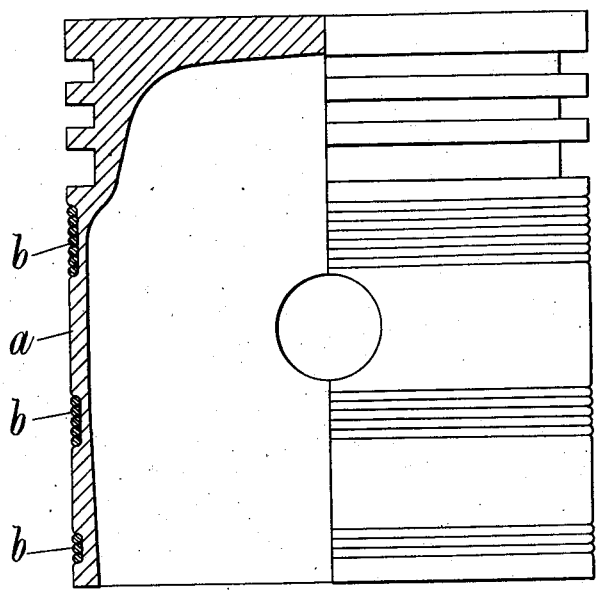

In Figure 2 the skirt $a$ of the piston is generally of uniform thickness and the gauge of the wire windings $b$ progressive decreases from top to bottom, as compared with the wire windings present in the piston of Figure 3 where the skirt is of gradually thicker cross section as the bottom of the skirt is approached, while the wire windings $b$ are of the same gauge.

Figure 4:
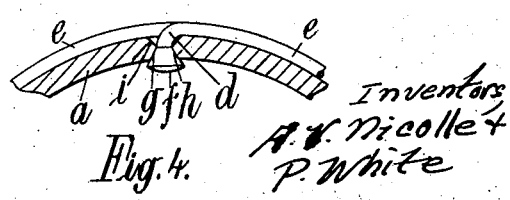
Figure 4 is a fragmentary part sectional view illustrating one mode of anchoring the end of the wire of a wire wound piston.

Referring now to Figures 4 to 12, which show various modes of anchoring the end of a wire to a piston to be wound therewith, in Figure 4 the end $d$ of the wire $e$ is shown formed with an enlarged head $f$ having a conical side surface $g$ which fits into a correspondingly shaped hole $h$ in the piston skirt $a$, the hole being recessed at the front of the skirt as shown at $i$ to permit of the turning over of the wire to lie flat against the outside surface of the skirt. This end of the wire constitutes the starting end, the length of wire to be wound on the skirt being passed through the hole $h$ in the piston to the outside of the skirt so that the head $f$ is firmly seated in the hold, and the finishing end of the wire may conveniently be bent over, as shown at $j$ in Figure 5, and passed through another hole $k$ in the piston skirt, and a blob of solder $l$ is applied over the end of the turned-over wire portion $k$ to secure the same in position on the piston. This mode of securing the finishing end of the wire by applying a blob of solder to a turned-over portion thereof passed through a hole in the piston to the inside thereof where the blob of solder is applied might possibly be employed also for securing the starting end of the wire to the piston.

Figure 6:
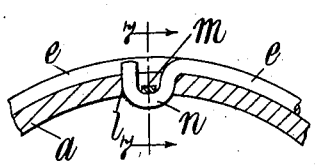
Figure 6 shows yet another mode of anchoring the end of the wire of a wire wound piston.
Figure 7:
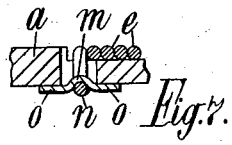
Figure 7 is a section on the line 7—7 of Figure 6.
Figure 8:
Figure 8 shows the clip employed in securing the wire according to Figures 6 and 7, and Figures 9 to 19 are views of yet other modes of attaching the wire.

The alternative method of securing the starting end of the wire to the skirt, shown in Figures 6 to 8, involves the formation of a hole $l$ in the piston skirt, and the use of a U-shaped clip $m$ which is passed over the end portion of the wire from the front surface of the piston to cause the end of the wire to be recessed into the hole, as shown at $n$, in which position the wire is secured upon the piston by the legs $o$ of the clip being bent, as shown in Figure 7, to lie against the inner surface of the skirt. The same mode of attachment may also be applied to the finishing end of the wire.

Figure 9:
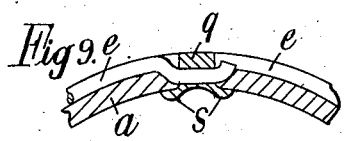
Figure 10:
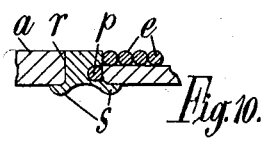
Figure 11:
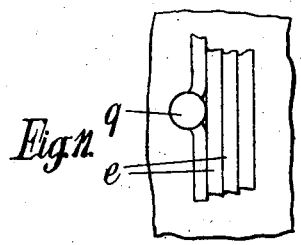
Figure 12:
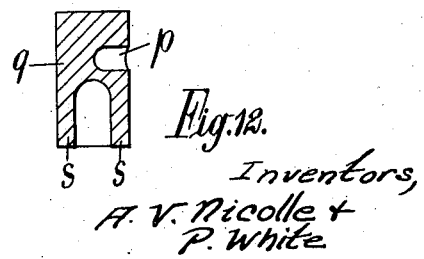

In the arrangement according to Figures 9 to 12, the terminal end of the wire is passed through a side slot or groove $p$ in a rivet $q$ which is passed into a hole $r$ in the piston skirt and has leg portions $s$ which are bent outwardly to lie against the inner surface of the piston skirt, as shown in Figure 10, in order to retain the terminal end portion of the wire in position upon the skirt, where such portion of the wire is given a recessed form, as shown in Figure 9. This mode of attachment may also be applied both to the starting and finishing ends of the wire.

Figure 13:
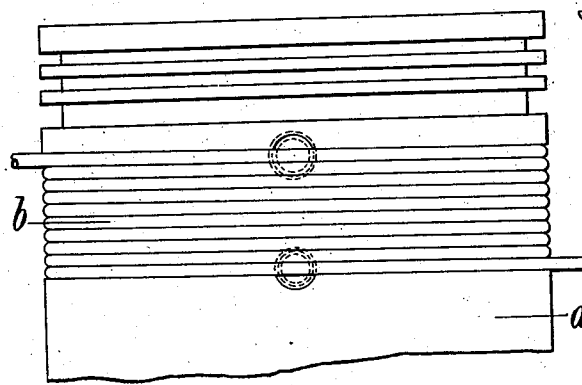
Figure 14:
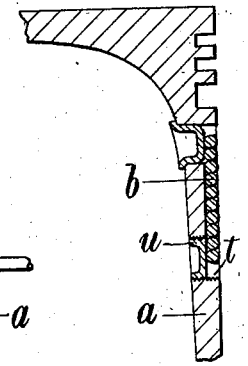

The mode of securing the wire in position is illustrated in Figures 13 and 14 and consists in providing holes or apertures in the piston skirt to receive plugs of steel, for example, to which the end convolutions of the wire winding can be secured as by spot welding. The plugs may be in the form shown at the top of Figure 14 or, alternatively, of the form shown at the bottom of the figure. Thus referring to the bottom of Figure 14 the skirt $a$ is provided with a tapped hole $t$ in which a plug $u$ is inserted before the piston undergoes its last machining operation which, when carried out, leaves the surface of the plug flush with that of the skirt, the thickness of the plug, after the finishing operation being preferably approximately equal to the gauge of the wire. One end of the wire is then welded to the plug and the winding operation can proceed, the finishing end of the wire is welded to another plug provided at a lower point on the skirt. An alternative to a screwed plug is shown at the top of Figure 14 in the form of a plain plug $v$ pressed from the inside of the skirt into the opening in the skirt and retained therein by being turned over at its inner periphery like a rivet.

Figure 15:
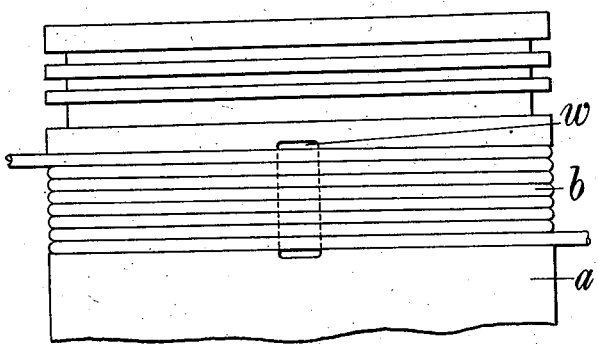
Figure 16:
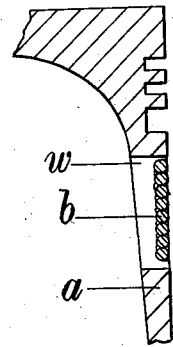
Figures 17, 19:
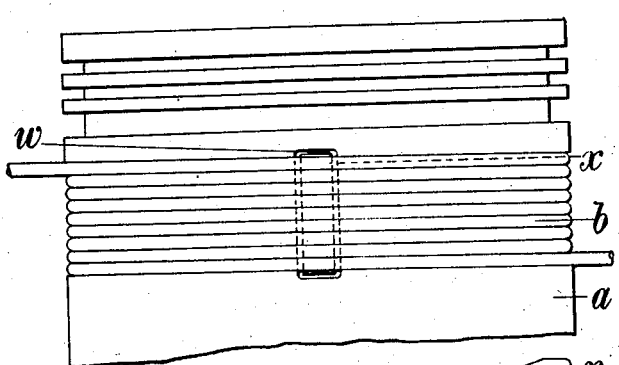
Figure 18:
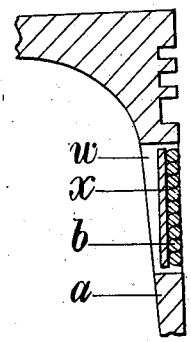

In Figures 15 and 16 the piston skirt $a$ is shown formed with an elongated slot $w$ past which the wire convolutions pass and in which region thereof the gap affords access to the wire from both sides of the skirt to permit of all the wires being welded together. Where the piston skirt is provided with a slot the wires may be welded to a plate $x$ located within the slot as shown in Figures 17 and 18 or the plate may be of the form shown in Figure 19, in which case only the wire of the two end convolutions thereof need be welded thereto.

The grooves presented by the wound wire between the adjacent turns thereof provide an ideal means of lubrication in that the grooves serve as a reservoir for the lubricant and the resulting surface provides an excellent bearing surface at the part or parts of the piston subjected to the greatest wear during use.

We claim:

1. A light metal piston primarily for internal combustion engines, comprising a piston body having an external annular groove and an encircling sheath of wire in said groove, said wire having a coefficient of expansion less than that of the metal of the piston body and having its ends anchored to the piston body and being under substantially no tension at atmospheric temperature.

2. The device as claimed in claim 1 in which the wire is formed to present an exterior corrugated surface to serve as a reservoir for lubricant.

3. A piston as claimed in claim 1, the piston body being made principally of aluminum and the wire being wound in closely adjacent turns completely filling the groove.

4. A light metal piston primarily for internal combustion engines comprising a piston body and an encircling sheath of wire on said body, said wire having a coefficient of expansion less than that of the metal of the piston body and having its ends anchored to the piston body and the said wire being under substantially no tension at atmospheric temperature.

5. A light metal piston primarily for internal combustion engines comprising a piston body having an axially immovable encircling sheath of wire having its ends anchored to the said body and having a coefficient of expansion less than that of the metal of the piston body, the said sheath being substantially unstressed at atmospheric temperature.

6. A light metal piston primarily for internal combustion engines comprising a piston body having an axially immovable encircling sheath of wire having its ends anchored to the said body and having a coefficient of expansion less than that of the metal of the piston body and forming an outer corrugated surface serving as a reservoir for lubricant, the said sheath being substantially unstressed at atmospheric temperature.

ARTHUR VILLENEUVE NICOLLE.
PERCY WHITE.